(12) United States Patent
Gauthier et al.

(10) Patent No.: US 7,767,177 B2
(45) Date of Patent: Aug. 3, 2010

(54) DEVICE PERMITTING THE REDUCTION OF NOX EMISSIONS FROM FCC FUMES

(75) Inventors: Thierry Gauthier, Brignais (FR); Romain Roux, Rueil Malmaison (FR); André Nicolle, Saint Genis Laval (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 65 days.

(21) Appl. No.: 11/955,828

(22) Filed: Dec. 13, 2007

(65) Prior Publication Data
US 2008/0152566 A1   Jun. 26, 2008

(30) Foreign Application Priority Data
Dec. 13, 2006   (FR) .................................. 06 10980

(51) Int. Cl.
*B01D 53/56* (2006.01)
*B01D 53/74* (2006.01)
*B01D 53/83* (2006.01)

(52) U.S. Cl. .................... 423/235; 423/239.1; 422/139; 422/141; 422/142; 422/144; 422/168; 422/169; 422/170; 422/171; 422/177; 422/178

(58) Field of Classification Search ................. 423/235, 423/239.1; 422/139, 141, 142, 144, 168–171, 422/177, 178
See application file for complete search history.

(56) References Cited

U.S. PATENT DOCUMENTS

| 3,844,973 | A | 10/1974 | Stine et al. |
| 4,283,273 | A | 8/1981 | Owen |
| 4,356,082 | A | 10/1982 | Groos |
| 4,812,430 | A | 3/1989 | Child |
| 4,814,068 | A | 3/1989 | Herbst et al. |
| 4,875,994 | A | 10/1989 | Haddad et al. |
| 5,338,439 | A | 8/1994 | Owen et al. |
| 2005/0019228 | A1* | 1/2005 | Myers et al. ................. 422/139 |
| 2008/0213150 | A1* | 9/2008 | Yaluris et al. ............. 423/239.2 |

FOREIGN PATENT DOCUMENTS

WO   WO 94/00236 A   1/1994

* cited by examiner

*Primary Examiner*—Timothy C Vanoy
(74) *Attorney, Agent, or Firm*—Millen, White, Zelano & Branigan, P.C.

(57) ABSTRACT

The present invention describes a new device which permits a reduction of NOx emissions contained in the fumes from FCC regenerators. The device consists essentially of a conveyance conduit which connects the two regeneration stages and which has an outlet opening into the dilute phase of the second stage.

20 Claims, 3 Drawing Sheets

DEVICE PERMITTING THE REDUCTION OF NOX EMISSIONS FROM FCC FUMES

DOMAIN OF THE INVENTION

The invention is concerned with a device which is intended to reduce nitric oxide waste (usually called NOx) contained in the fumes issuing from the regenerators of FCC units. The term FCC is the abbreviation used to designate any kind of catalytic cracking unit in fluidised bed. Catalyst in the catalytic cracking units can be regenerated in one stage only (the so-called single-regenerator technology), or be divided into two stages.

The single-stage technology consists in carrying out as fully as possible the combustion of coke deposited on the catalyst, the temperature generally being between 650° C. and 760° C. The two-stage technology consists in carrying out a first combustion step in the absence of air in order to limit the temperature to about 630-700° C., whilst giving off the major part of the water emanating from the hydrogen contained in the coke. The second stage is carried out in an excess of air, and reaches higher temperatures of up to 850° C., without the risk of the catalyst deteriorating.

The regeneration takes place in a fluidised bed, the catalyst being fluidised by the air which is introduced for the purpose of burning the coke. The regeneration zone must always have at least one device for separating the combustion gases or fumes which are expelled, and the regenerated catalyst which is re-introduced into the reaction zone for the purpose of dedusting the fumes. The first stage of the gas-solid separation can be carried out by means of a separation device which is usually based on a change-of-direction effect, and which makes it possible for about 60% to 90% of catalyst particles entrained above the bed to be conveyed back to the dense phase.

The second gas-solid separation stage is usually carried out by means of one or two cyclone stages which are fed by the gas-solid suspension containing nothing else apart from the catalyst particles which were not separated in the first stage.

The device for reducing NOx according to the present invention is, in fact, compatible with all gas-solid separation systems of the regeneration zone, irrespective of whether this latter is in one stage or in two stages.

The two-stage regeneration, such as that known by the commercial name R2R, is described in U.S. Pat. No. 4,332,674A. It permits the treatment of heavier charges than a single-stage single-regenerator type technology. Double regeneration makes it possible to limit heating of the catalyst on heavy charges which produce more coke, thereby making it possible to maintain cracking conditions which will promote the production of better yields.

In the first stage, partial combustion in the absence of oxygen limits temperature rise. Furthermore, more rapid combustion of the hydrogen from the coke permits the release of the major part of the water at a relatively low temperature level, thereby making it possible to avoid the hydrothermal decomposition phenomenon of the catalyst. In the second regenerator, combustion is total, and takes place in an atmosphere which has a low humidity rate, thereby avoiding deactivation of the catalyst. The total combustion temperature in the second stage is between 700° C. and 850° C. depending upon the kind of charge.

Compared to other regeneration technologies, the two-stage regeneration technology also makes it possible to limit the formation of NOx in the first regenerator, particularly for heavy charges which tend to release a significant quantity of NOx as a result of the CO-rich atmosphere which prevails there.

Therefore, it is, in particular, in the second regenerator that significant amounts of NOx are formed. The object of the invention is therefore, more particularly, to propose a solution for reducing NOx emissions within the second regenerator.

Nonetheless, it has been seen that the device of the present invention, which is particularly well-suited to a two-stage regeneration zone, can also be used with a single-stage regeneration zone.

Hereinafter, the term, "device for the reduction of NOx" will be used to denote the object of the present invention which is applied either to a second regeneration stage in a two-stage regeneration technology, or to a single regeneration stage in single regenerator technology. The present device is compatible with any kind of system for separating catalyst and combustion gases, in particular with prior art systems of the "cruciform release" type. Indeed, in the case of a two-stage regeneration zone, the present device is combined with the gas-solid separation system with which it shares the use of the same vertical conveyance conduit connecting the two stages of the regeneration zone. In the case of a single-stage regeneration zone, the device according to the invention is independent of the gas-solid separation system. The device for the reduction of NOx according to the present invention aims to reduce the NOx concentration contained in fumes to less than 15 ppm, and, preferably, to less than 10 ppm, these values corresponding to a distillate type charge in vacuo containing of the order of 1000 ppm nitrogen.

It should be remembered that the level of NOx in fumes issuing from the regeneration zone of an FCC unit of current technology, whether it be a single stage regeneration or two-stage regeneration, is typically between 50 ppm and 400 ppm, and cannot go below 50 ppm. The benefits achieved by the device according to the invention are therefore quite considerable.

EXAMINATION OF THE PRIOR ART

In FCC regenerators, combustion of the coke deposited on the catalyst produces nitric oxides (NOx) which are contained in the fumes discharged into the atmosphere, which make acid rain and give rise to the formation of a photochemical fog.

These emissions result almost exclusively from the oxidation of the nitrogen which is initially present in fuel in the form of azoles and pyridines. The main parameters determining the production of NOx are richness (coke/oxygen ratio) and the mass fraction of nitrogen present in the coke. In fact, the transfer of nitrogen contained in the charge onto the coke deposited on the catalyst is about 50%. The combustion is said to be rich if the mass ratio of coke/oxygen is greater than 0.3, and the combustion is said to be poor if that ratio is less than 0.3.

Conventionally, NOx emissions are reduced either in situ by additives which promote NO reduction and which act when in contact with carbon or with carbon monoxide, or by way of curative methods for the selective reduction of non-catalytic NOx (so-called SNCR, or Selective Non Catalytic Reduction), or of the SCR type (or Selective Catalytic Reduction) if the reactions are carried out in the presence of a catalyst (usually vanadium oxide).

A description of the SNCR process can be found in U.S. Pat. No. 3,900,554.

U.S. Pat. No. 6,503,460B1 describes a counter-current, staged regeneration concept which can be applied to a single-regenerator. The counter-current flow is ensured by positioning the catalyst dispenser so that it overhangs the dense bed. The NOx formed during combustion in the lean medium in the lower part of the dense bed are thus reduced in the rich medium in contact with the carbon and carbon monoxide present in the upper part of the bed. Furthermore, since some of the coke is used up in the partial oxidation zone, the catalyst which reaches the zone with excess oxygen is slightly coked, thus making it possible for the combustion rate of the coke to be moderated.

Nonetheless, that concept has only been applied to a single-regenerator. Now, two-stage regeneration, such as the R2R technology described in U.S. Pat. No. 4,332,674A, in comparison with a single-regenerator type technology, permits the treatment of heavier charges with greater yields. In R2R technology, the ascending vertical conduit (or "lift") connecting two regeneration stages opens into dense phase.

U.S. Pat. No. 0,198,778 describes a method for collecting NOx by means of a basic solution which is conveyed counter-current to the gas-solid suspension by means of a "scrubber" type system, after having converted the NO into $NO_2$ and $NO_3$.

BRIEF DESCRIPTION OF THE INVENTION

The present invention consists of a device for reducing the NOx contained in the fumes from the regeneration zone of an FCC unit, said regeneration zone comprising either one single stage which operates in fluidised bed and which has a dense phase above which is disposed a dilute phase, or two stages which operate in a fluidised bed and which are connected by a vertical ascending conduit which operates in a transported bed and which comprises at the upper end thereof a gas-solid separation system.

In the case of a single-stage regeneration zone, the device according to the invention consists essentially in connecting the dense phase and dilute phase of the fluidised bed constituting said stage, by way of a vertical ascending conduit fed by an adequate air flow, in such a way that the upper end of the conduit opens into the dilute phase of the fluidised bed, at a distance of between 0.10 and 1.5 times the diameter of the dense phase, above the interface separating the dense phase and said dilute phase. Preferably, that distance will be between 0.2 and 0.5 times the diameter of the dense phase.

In the case of a two-stage regeneration zone, a vertical ascending conduit already exists which connects the two regeneration stages and which is intended to convey the catalyst from the first stage to the second. The device according to the present invention consists essentially in using said conduit in such a way that the upper end thereof opens into the dilute phase of the second regeneration stage at a height which is between 0.10 and 1.5 times the diameter of the dense phase above the interface separating the dense phase and said dilute phase.

Preferably, that distance will be between 0.5 and 1 times the diameter of the dense phase of the second stage;

In the case of a single-stage regeneration zone, the ratio between the mass flow rate of air entering the vertical conduit connecting the dense phase and the dilute phase of said stage and the mass flow rate of air entering the dense phase of the fluidised bed is generally between 0.05 and 0.1.

In the case of a two-stage regeneration zone, the ratio between the mass flow rate of air entering the vertical conduit connecting the two regeneration stages and the mass flow rate of air entering the dense phase of the second stage is generally between 0.1 and 0.7, and is preferably between 0.25 and 0.5.

The present invention can also be viewed as a process for reducing NOx contained in the fumes from the regeneration zone of an FCC unit, whether said zone be a single-stage or two-stage zone, employing the device according to the invention, permitting a reduction in NOx content to a value which is less than 15 ppm, and preferably less than 10 ppm.

DETAILED DESCRIPTION OF THE INVENTION

Figure 1:
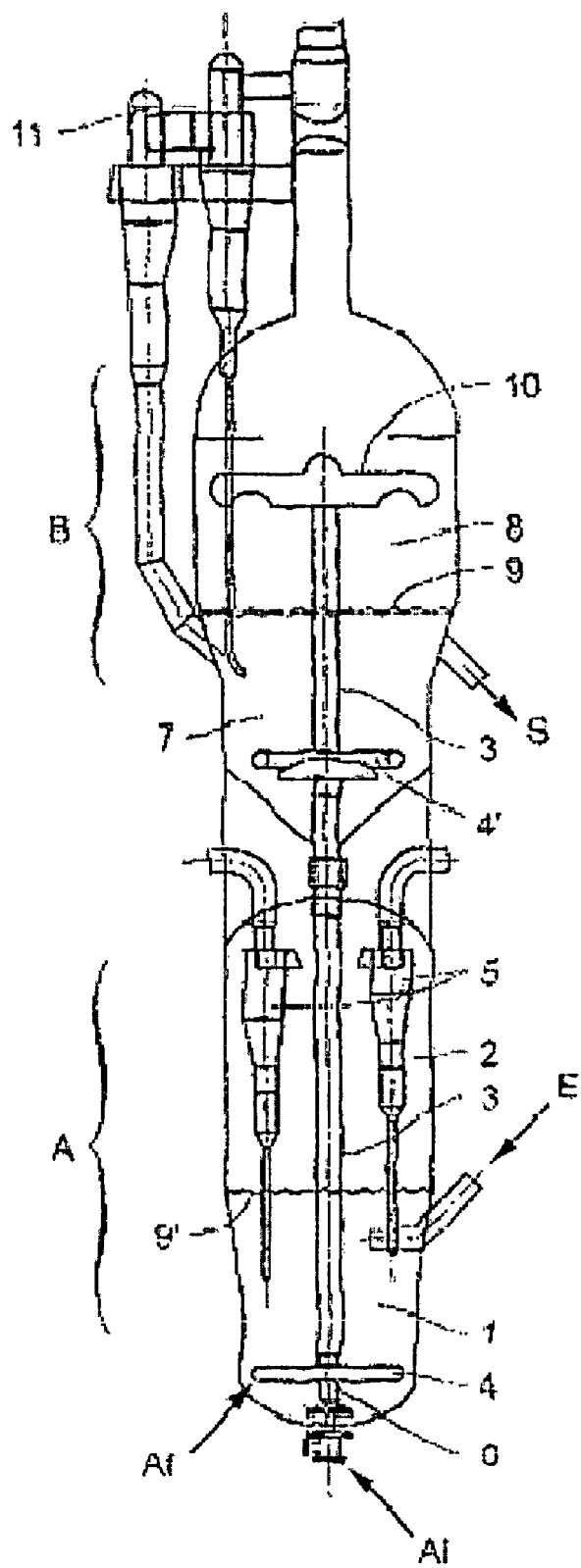
FIG. 1 is a diagrammatic view of the device according to the invention, wherein the two stages of a regeneration zone are connected by a conduit which conveys catalyst from the first stage to the second. The gas-solid separation system located at the upper end of the conduit, such as shown in FIG. 1, does not involve any limitation, since the present invention is compatible with any gas-solid separation system. It has been shown by way of example in the form of a simple "cruciform release" system.
Figure 2:
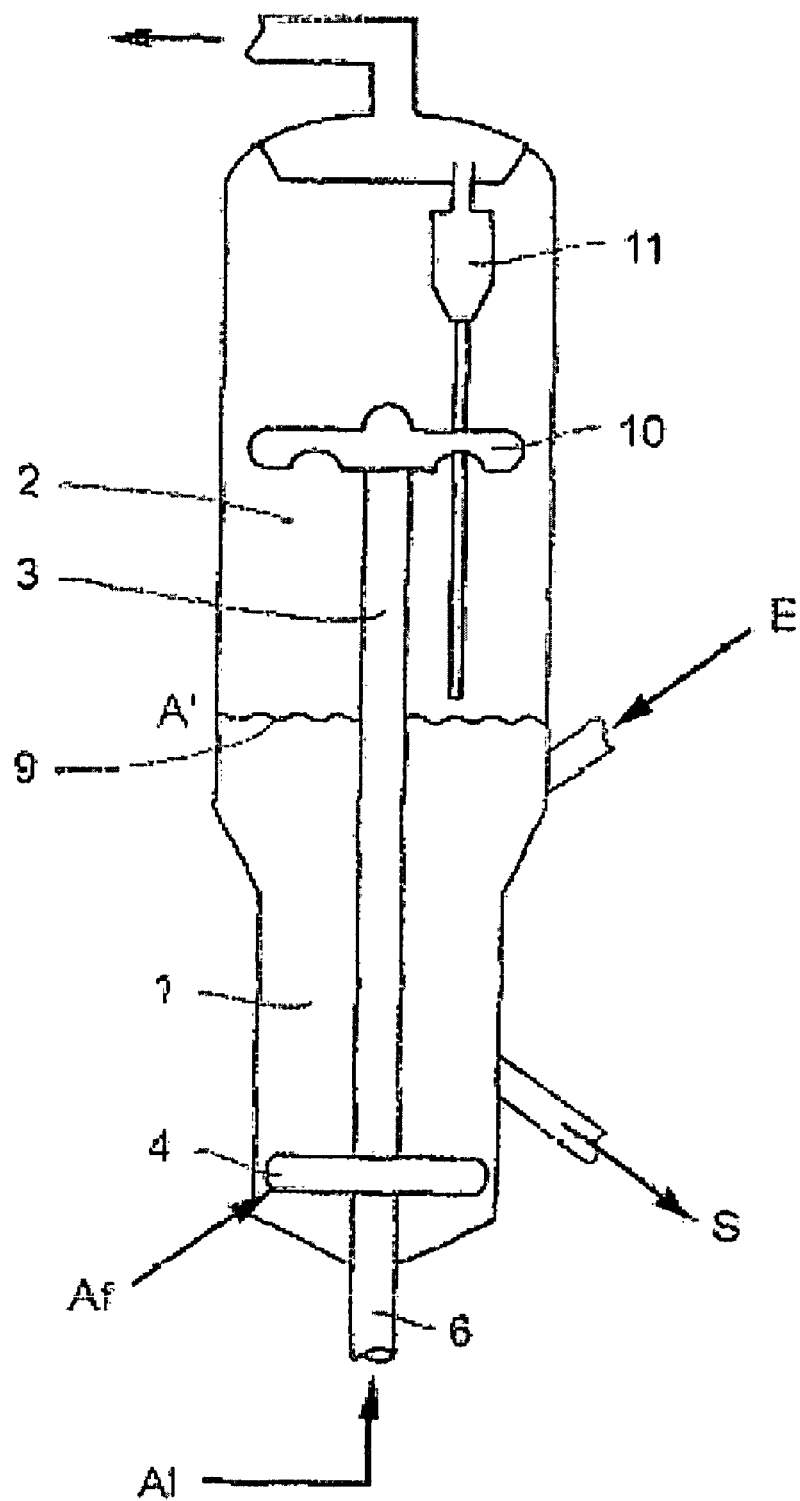
FIG. 2 shows diagrammatically the device according to the invention in the case of a single-stage regeneration zone. In the same way, without any limitation being implied, the separation system has been shown diagrammatically in the form of a simple "cruciform release" system.

The numbers in brackets in the text correspond to the numbering in FIG. 1 for a two-stage regeneration zone, and to the numbering in FIG. 2 for a single-stage regeneration zone. The numbering in FIGS. 1 and 2 is common to both where parts of the device of the invention are denoted which are the same.

The Case of a Two-Stage Regeneration Zone

The device for reducing NOx according to the present invention can be used with catalytic cracking units in fluidised bed which have a two-stage regeneration zone, the two stages being connected by a tubular conduit of substantially vertical and elongate shape, which will be referred to hereinafter simply as "vertical conduit", denoted by the reference numeral (3) in FIG. 1.

The first stage (A) of the regeneration zone is constituted by a fluidised bed which is fed by a flow of solid particles arriving via conduit (E) from a reaction zone (not shown) and having a dense phase (1) fed by fluidization air (Af) so as to obtain a fluidisation rate which is usually between 0.5 and 1.5 m/s.

The fluidisation rate is defined as the ratio of the volume flow rate of air under the pressure and temperature conditions of the stage under consideration to the empty section of the dense bed.

The fluidisation member (4), shown in FIG. 1, is, by way of example, a ring with holes therethrough, but any fluidisation member is suitable, the invention not being in any way associated with one particular fluidisation technology.

The first regeneration stage (A) performs combustion in the absence of air, in such a way that a combustion temperature of between 600° C. and 720° C. is maintained.

Located above the dense bed (1) of the first stage (A) is a dilute phase (2) which is equipped in the upper part thereof with gas-solid separation means (5) enabling most of the catalyst particles (in general, more than 99.9% of them) to be conveyed back to the dense phase (1), and the fumes which are usually conveyed to a carbon monoxide post-combustion unit, called the "CO boiler" and not shown in FIG. 1, to be released.

Leading from the dense phase (1) of the first stage (A) is the vertical ascending conduit (3) enabling the catalyst to be conveyed from the first regeneration stage to the second stage (B). The vertical conduit (3) is fed with air (A1) in such a way that the flow rate of gas in the conduit is between 3 m/s and 15 m/s, with a flow of solid particles of between 200 and 1000 kg/m2.s.

The temperature of the catalyst at the intake of the vertical conduit is that of the dense phase surrounding it. Inside the vertical conduit (3), combustion of some of the coke takes place, accounting for between 5% and 15% of the total amount of coke deposited on the catalyst. The device permitting the intake of the amount of catalyst and of air necessary for the vertical conduit (3) to operate properly is usually in the form of a mechanical valve, e.g. a frustoconical valve (6) disposed at the lower end of said conduit, and leading to a greater or lesser extent into the interior of said conduit, defining an annular space through which the catalyst flows.

Generally, the flow of catalyst defined by the degree of penetration of the frustoconical valve (6) is curbed at the location of the dense bed (7) of the first or second regeneration stage (B). Within the context of the present invention, the flow rate of air in the vertical conduit (3) is defined by the relationship with the flow rate of fluidisation air of the dense bed (1) of the first stage, i.e. 0.1 to 0.7, and preferably 0.25 to 0.5. For a R2R type unit, that ratio is usually between 0.3 and 0.4.

The vertical conduit (3) opens into the dilute phase (8) of the second regeneration stage (B) at a height which is between 0.15 and 1.5 times the diameter of the dense phase (9). If the second regeneration stage is between 6 and 10 metres in diameter, the vertical conduit (3) opens into the dilute phase (8) of the second stage, at a height of between 2 and 8 metres above the interface (9) separating the dense phase (7) and said dilute phase (8) of that second stage.

The interface (9) is not a very clearly defined notion for fluidised beds once the superficial fluidizing velocity exceeds 0.1 m/s.

Within the context of the present invention, the interface is accurately defined on the basis of the curve showing the trend of the loss of charge between two points: the one point being located in the dense phase, and the other point, the current point, being located in the dense phase and then in the dilute phase, as a function of the elevation along the regenerator.

The start of the elevations is selected randomly as being that of the plane in which the fluidisation member is located. The curve indicating loss of charge as a function of elevation reveals a sudden change to the slope upon passing said interface, i.e. when the current point passes from the dense phase to the dilute phase, the density of the fluidised medium being very different depending upon whether one is in the dense phase or dilute phase. The interface (9) corresponds to that sudden change in the loss of charge curve.

The upper end of the vertical conduit (3) interlocks with a gas-solid separation system (10) which will not be described here since any prior art system is compatible with the device according to the present invention.

Generally, the system is one which is based on a sudden change of direction of the gas-solid suspension which allows the solid particles to be directed downwardly so as to rejoin the dense phase (7) of the fluidised bed which constitutes the second regeneration stage. An example of gas-solid separation systems which are installed at the upper end of the vertical conduit (3) are T-shaped systems, or cruciform systems, or more complex systems which have a separate outlet for the gases and for the solid particles.

The catalyst particles which have not rejoined the dense phase (7) are to be found in suspension in the fumes and are conveyed to one or more cyclone stages (11) permitting the release into the atmosphere of fumes usually containing less than 1 gramme/Nm3 of solid particles.

The dense bed (7) of the second regeneration stage is fed with fluidisation air by means of a fluidisation member (41) similar to that with which the dense phase (1) of the first stage is equipped. That second stage (B) operates in total combustion with an oxygen concentration in the fumes which is generally between 0.5% and 5%.

The combustion temperature is between 700° C. and 850° C. The fluidisation rate is generally within the range of 0.3 to 1 m/s.

The Case of a Single-Stage Regeneration Zone

The description of a single-stage regeneration zone (A'), such as illustrated in FIG. 2, is virtually identical to the description of the fluidised bed of the first stage (A) in the case of two-stage regeneration.

The single-stage regeneration zone (A') is constituted by a fluidised bed which is fed by a flow of coked catalyst particles arriving via conduit (E) and leaving via the outlet conduit (S). The dense bed (1) is fed with fluidisation air via a fluidisation member (4) so as to obtain a fluidisation rate of between 0.3 and 1.5 m/s.

When combustion is total, the temperature is between 600° C. and 850° C., preferably between 650° C. and 760° C.

The upper end of the vertical conduit (3) opens into the dilute phase (2) at a height of between 0.1 and 1.5 times the diameter of the fluidised bed in dense phase above the interface (9) separating the dense phase (1) and the dilute phase (2). The interface (9) is defined in accordance with the method which has been outlined in the above paragraph.

The upper end of the vertical conduit (3) interlocks with a gas-solid separation system (10) which will not be described here since any prior art system is compatible with the device according to the present invention.

In general, the system is one which is based on a sudden change in direction of the gas-solid suspension, enabling the solid particles to be directed in a downward direction in order to rejoin the dense phase (1).

Examples of gas-solid separation systems embedded at the upper end of the vertical conduit (3) are T-shaped systems or cruciform systems, or more complex systems which have a separate outlet for the gas and for the solid particles.

The catalyst particles which have not rejoined the dense phase (1) are found to be in suspension in the fumes, and are conveyed to one or more cyclone stages (11) permitting the release into the atmosphere of the fumes which contain less than 1 gramme/Nm3 of solid particles.

The fluidisation member of the dense bed (1), shown in FIG. 2 by way of example, is a fluidisation ring (4), but the invention is in no way associated with any one particular technology of fluidisation ring.

In the same way as for the vertical conduit which connects the two regeneration stages, the vertical conduit (3) is fed at the bottom thereof by the conveyance air, and the catalyst intake device is usually of the same kind as that described with reference to the two-stage technology.

EXAMPLES

The first example is a comparative example concerning a 2-stage regeneration zone. The catalyst is constituted by particles with a mean diameter of 70 microns and with a density of 1700 kg/m3.

The nitrogen fraction deposited on the coked catalyst, expressed in % by weight, is still 0.04% by mass (i.e. 400 ppm by mass).

Sulphur is present in the coke to a level of 0.06% by weight.

The composition by mass of the coke deposited on the catalyst is 91.3% by weight of carbon and 8.6% by weight of H.

The unit treats a charge of the hydrotreated atmospheric residue kind at a rate of: 160 tonnes 1 hour.

The operating conditions of the two regeneration stages are given hereinafter. The mass flows are expressed as a proportion of the flow rate of the charge.

Flow rate of coke entering the first stage: 8.2% of the mass flow rate of the charge.

Flow rate of catalyst entering the first stage: 7.6 times the mass flow rate of the charge.

Flow rate of the air entering the first stage: 68% of the mass flow rate of the charge.

Temperature in the first stage: 650° C.

Flow rate of air in the vertical conduit: 11% of the mass flow rate of the charge Flow rate of the air entering the second stage: 24% of the mass flow rate of the charge.

Temperature of the second stage: 735° C.

The ratio of the flow rate of the air in the vertical conduit to the flow rate of fluidisation air is 0.45.

The prior art unit has a vertical conduit connecting the first regeneration stage to the second one and which opens into the dense phase of the second stage. The unit according to the present invention has a vertical conduit (3) which connects the first stage (A) to the second stage (B), and which opens into the dilute phase of the second stage at a height of 5 metres above the interface (9) separating the dense phase and the dilute phase of the second stage. The dense bed of the second regeneration stage is 6 metres in diameter.

The lower end of the vertical conduit (3) is located 0.5 m above the plane containing the fluidisation member (4).

The curve in FIG. 3 hereinbelow shows the trend of the NO content (X), measured in the fumes from the outlet of the second regeneration stage (B), expressed in ppm by volume, as a function of the height (H) of the outlet of the vertical conduit (3) connecting the two regeneration stages.

Figure 3:
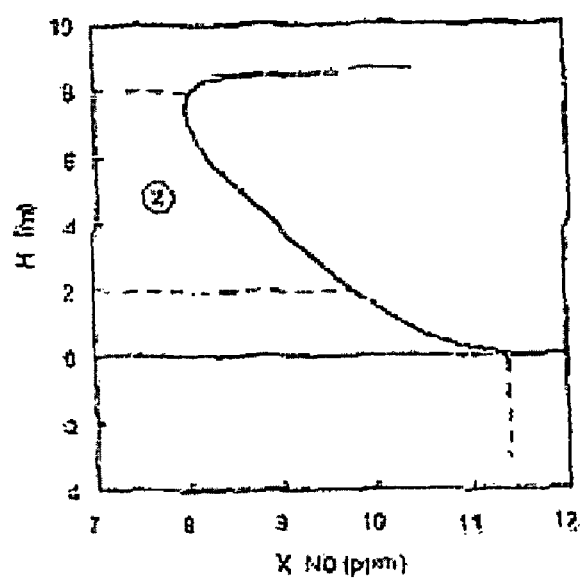
FIG. 3 illustrates the effect of the height of the outlet of the device according to the invention on the NOx content in the fumes, in the case of a two-stage regeneration unit.

The case of a conventional unit, wherein the vertical conduit has an outlet opening into the dense phase of the second stage, corresponds to the portion shown by broken lines on the graph of FIG. 3.

The case of a unit which is equipped with the device according to the invention corresponds to an outlet opening out above the interface separating the dense phase and the dilute phase represented by the continuous curve in FIG. 3.

It is noted that in the case of a conventional unit, the NO content remains roughly constant and is equal to 11.5 ppm, whereas according to the invention the NO content decreases to a minimum value of 8 ppm which is reached when the outlet from the vertical conduit is at a height of between 2 and 8 metres above the interface (zone denoted as Z in FIG. 3).

The second example is a comparative example concerning a single-stage regeneration zone. The FCC unit in this example is a single-stage regeneration unit, the diameter of the dense bed of which is 10 metres.

The prior art unit has no vertical conduit connecting the dense phase and dilute phase.

The unit according to the present invention has a vertical conduit (3) which connects the dense phase (1) and the dilute phase (2), the lower end of which is located 0.5 m above the plane containing the fluidisation member (4), and the upper end of which has an outlet 2 metres above the interface (9) separating the dense phase and the dilute phase.

The nitrogen fraction in the coke which has been deposited on the catalyst, expressed as % by weight, is still 400 ppm.

The flow rate of charge is still 160 tonnes/hour.

The operating conditions of the regeneration stage are as follows:

Flow rate of coke entering: 8.2% of the mass flow rate of the charge

Flow rate of catalyst: 760% of the mass flow rate of the charge

Flow rate of fluidisation air: 134% of the mass flow rate of the charge

Flow rate of the air introduced into the vertical conduit (according to the invention) 11% of the mass flow rate of the charge Regeneration temperature: 735° C.

The ratio of the air introduced into the vertical conduit to the fluidisation air is 0.083.

The curve of FIG. 4 hereinafter shows the trend of the NO content, measured in the fumes from the regeneration stage, as a function of the height of the outlet of the vertical conduit (3) connecting the dense phase and the dilute phase of said stage.

Figure 4:
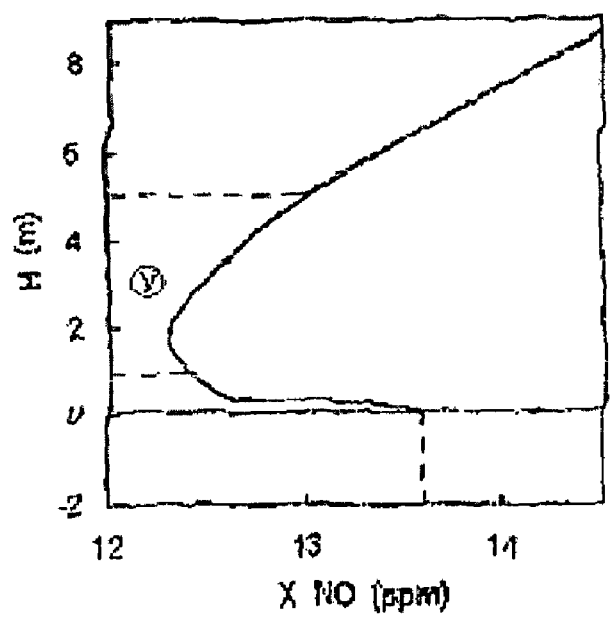
FIG. 4 illustrates the effect of the height of the outlet of the device according to the invention on the content of NOx in fumes in the case of a single-stage regeneration unit.

The case of a conventional unit without a vertical conduit connecting the dense phase and dilute phase is shown by the broken line curve of FIG. 4.

The case of a unit equipped with the device according to the invention is shown by the solid line curve of FIG. 4.

It is noted that in the case of a conventional unit, the NO content remains roughly constant and is equal to 13.5 ppm, whilst according to the invention the NO content becomes reduced to a minimum value of 12.2 ppm which is reached when the vertical conduit has an outlet at a height of 2 metres above the interface (9) between the dense phase (1) and the dilute phase (2).

All of the zone denoted by Y in FIG. 4 and extending from 1 to 5 metres above the interface (9) can be used as the outlet zone of the vertical interface (3) connecting the dense phase (1) and dilute phase (2).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

The entire disclosures of all applications, patents and publications, cited herein and of corresponding French application No. 06/10.980, filed Dec. 13, 2006 are incorporated by reference herein.

From the foregoing description, one skilled in the art can easily ascertain the essential characteristics of this invention and, without departing from the spirit and scope thereof can make various changes and modifications of the invention to adapt it to various usages and conditions.

The invention claimed is:

1. A device for reducing NOx contained in the fumes from an FCC unit, comprising a 2-stage regeneration zone which comprises an ascending vertical conduit (3) connecting the two regeneration stages (A) and (B) and the upper end of which opens into the dilute phase of the second stage (B) at a distance above the interface (9) separating the dense phase and the dilute phase of said second stage (B) of between 0.1 and 1.5 times the diameter of the fluidised bed in dense phase of said second stage.

2. A device for reducing NOx contained in the fumes from an FCC unit according to claim 1, in which the upper end of the ascending vertical conduit (3) which connects the 2 regeneration stages opens into the dilute phase of the second stage at a distance above the interface separating the dense phase and the dilute phase of the second stage of between 0.5 and 1.0 times the diameter of said second stage.

3. A device for reducing the NOx contained in the fumes from an FCC unit according to claim 1, in which the upper end of the ascending vertical conduit (3) connecting the 2 regeneration stages is equipped at its upper end with a gas-solid separation system comprising an outlet for the gases and a separate outlet from the first for the solid.

4. A device for reducing the NOx contained in the fumes from an FCC unit, comprising a single-stage regeneration zone comprising an ascending vertical conduit (3) connecting the dense phase (2) and the dilute phase (3), and the upper end of which opens into the dilute phase (2), at a distance of between 0.1 and 1.5 times the diameter of the dense bed above the interface (9) separating the dense phase (1) and said dilute phase (2).

5. A device for reducing the NOx contained in the fumes from an FCC unit according to claim 4, in which the vertical conduit (3) connecting the dense phase (1) and the dilute phase (2) opens out above the interface (9) separating the two phases, at a distance of between 0.2 and 0.5 times the diameter of the dense bed (1).

6. A device for reducing the NOx contained in the fumes from an FCC unit according to claim 4, in which the vertical conduit (3) connecting the dense phase (1) and the dilute phase (2) is equipped in its upper part with a gas-solid separation system comprising an outlet for the gas and an outlet separate from the first one for the solid.

7. A process for reducing the NOx contained in the fumes from an FCC unit comprising a 2-stage regeneration zone, comprising passing said fumes through a device according to claim 1, in which the fluidisation rate in the dense phase of the second regeneration stage (B) is between 30 cm/s and 100 cm/s.

8. A process for reducing the NOx contained in the fumes from an FCC unit comprising a 2-stage regeneration zone, comprising passing said fumes through a device according to claim 1, in which the ratio between the mass flow rate of air entering the vertical conduit (3) connecting the two regeneration stages and the mass flow rate of air entering the dense phase of the second stage (B) is between 0.1 and 7.

9. A process for reducing the NOx contained in the fumes from an FCC unit comprising a single-stage regeneration zone, comprising passing said fumes through a device according to claim 4, in which the fluidisation rate in the dense phase of the fluidised bed is between 50 and 150 cm/s.

10. A process for reducing the NOx contained in the fumes from an FCC unit comprising a single-stage regeneration zone, comprising passing said fumes through a device according to claim 4, in which the ratio between the mass flow rate of air introduced into the vertical conduit (3) and the flow rate of air injected into the dense phase (1) is between 0.05 and 0.1.

11. A process for reducing the NOx contained in the fumes from an FCC unit comprising a single-stage or two-stage regeneration zone, comprising passing said fumes through a device according to claim 1, in which the rate of the gas inside the vertical conduit (3) connecting the two regeneration stages, or connecting the dense phase and the dilute phase in the case of a single-stage regeneration zone, is between 3 m/s and 15 m/s.

12. A process for reducing the NOx contained in the fumes from an FCC unit comprising a single-stage or two-stage regeneration zone, comprising passing said fumes through a device according to claim 1, in which the ratio of the mass flow rate of coke and the mass flow rate of oxygen at the intake of the ascending vertical conduit (3) is greater than 0.3.

13. A process for reducing the NOx contained in the fumes from an FCC unit comprising a single-stage or two-stage regeneration zone, comprising passing said fumes through a device according to claim 4, in which the rate of the gas inside the vertical conduit (3) connecting the two regeneration stages, or connecting the dense phase and the dilute phase in the case of a single-stage regeneration zone, is between 3 m/s and 15 m/s.

14. A process for reducing the NOx contained in the fumes from an FCC unit comprising a single-stage or two-stage regeneration zone, comprising passing said fumes through a device according to claim 4, in which the ratio of the mass flow rate of coke and the mass flow rate of oxygen at the intake of the ascending vertical conduit (3) is greater than 0.3.

15. A device according to claim 1 for reducing NOx contained in the fumes from an FCC unit, comprising a 2-stage regeneration zone which consists of an ascending vertical conduit (3) connecting the two regeneration stages (A) and (B) and the upper end of which opens into the dilute phase of the second stage (B) at a distance above the interface (9) separating the dense phase and the dilute phase of said second stage (B) of between 0.1 and 1.5 times the diameter of the fluidised bed in dense phase of said second stage.

16. A device according to claim 4 for reducing the NOx contained in the fumes from an FCC unit, comprising a single-stage regeneration zone consisting of an ascending vertical conduit (3) connecting the dense phase (2) and the dilute phase (3), and the upper end of which opens into the dilute phase (2), at a distance of between 0.1 and 1.5 times the diameter of the dense bed above the interface (9) separating the dense phase (1) and said dilute phase (2).

17. A process for reducing the NOx contained in the fumes from an FCC unit comprising a 2-stage regeneration zone, comprising passing said fumes through a device according to claim 1, in which the fluidisation rate in the dense phase of the second regeneration stage (B) is between 40 cm/s and 80 cm/s.

18. A process for reducing the NOx contained in the fumes from an FCC unit comprising a 2-stage regeneration zone, comprising passing said fumes through a device according to claim 1, in which the ratio between the mass flow rate of air entering the vertical conduit (3) connecting the two regeneration stages and the mass flow rate of air entering the dense phase of the second stage (B) is between 0.25 and 0.5.

19. A process for reducing the NOx contained in the fumes from an FCC unit comprising a single-stage regeneration zone, comprising passing said fumes through a device according to claim 4, in which the fluidisation rate in the dense phase of the fluidised bed is between 70 and 130 cm/s.

20. A process for reducing the NOx contained in the fumes from an FCC unit comprising a single-stage or two-stage regeneration zone, comprising passing said fumes through a device according to claim 1, in which the rate of the gas inside the vertical conduit (3) connecting the two regeneration stages, or connecting the dense phase and the dilute phase in the case of a single-stage regeneration zone, is between 5 m/s and 8 m/s.

* * * * *